(12) United States Patent
Kim

(10) Patent No.: US 10,013,100 B2
(45) Date of Patent: Jul. 3, 2018

(54) TOUCH PANEL

(71) Applicant: Samsung Display Co., Ltd., Yongin-si (KR)

(72) Inventor: Jee Hoon Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 268 days.

(21) Appl. No.: 14/847,657

(22) Filed: Sep. 8, 2015

(65) Prior Publication Data

US 2016/0306486 A1 Oct. 20, 2016

(30) Foreign Application Priority Data

Apr. 14, 2015 (KR) ........................ 10-2015-0052484

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01); *G06F 2203/04112* (2013.01)

(58) Field of Classification Search
CPC .................. G06F 3/0416; G06F 3/044; G06F 2203/04103; G06F 2203/04112
See application file for complete search history.

(56) References Cited

U.S. PATENT DOCUMENTS

| | | | | | |
|---|---|---|---|---|---|
| 8,587,533 | B2 * | 11/2013 | Nishihara | ............ | G06F 3/0416 345/173 |
| 8,593,410 | B2 * | 11/2013 | Hong | .................... | G06F 3/0412 178/18.01 |
| 8,593,413 | B2 * | 11/2013 | Chuang | ................... | G06F 3/044 345/173 |
| 8,603,574 | B2 * | 12/2013 | Huang | .................. | H05K 1/028 349/159 |
| 8,902,178 | B2 * | 12/2014 | Han | ...................... | G06F 3/0416 178/18.01 |
| 8,917,250 | B2 * | 12/2014 | Kim | ..................... | H05K 1/0289 345/173 |
| 8,952,920 | B2 * | 2/2015 | Kuo | ...................... | G06F 3/0418 345/173 |
| 8,988,371 | B2 * | 3/2015 | Ho | .......................... | G06F 3/044 345/156 |
| 9,335,842 | B2 * | 5/2016 | Tsai | ........................ | G06F 3/044 |
| 2011/0187673 | A1 * | 8/2011 | Yin | ........................ | G06F 3/044 345/174 |
| 2012/0313871 | A1 * | 12/2012 | Tsai | ........................ | G06F 3/041 345/173 |

(Continued)

FOREIGN PATENT DOCUMENTS

| | | |
|---|---|---|
| JP | 2012-053812 | 3/2012 |
| KR | 10-2012-0027956 | 3/2012 |
| KR | 10-2013-0021588 | 3/2013 |

*Primary Examiner* — Amare Mengistu
*Assistant Examiner* — Jennifer Zubajlo
(74) *Attorney, Agent, or Firm* — H.C. Park & Associates, PLC

(57) ABSTRACT

A touch panel including a substrate a first signal line positioned on the substrate and extending in a first direction while being bent in a second direction several times and a second signal line positioned on the substrate and extending in the second direction while being bent in the first direction intersecting the first direction several times to intersect the first signal line.

11 Claims, 4 Drawing Sheets

(56) References Cited

U.S. PATENT DOCUMENTS

| | | | |
|---|---|---|---|
| 2013/0314625 A1* | 11/2013 | Tsai | G06F 3/044 349/12 |
| 2014/0238730 A1 | 8/2014 | Nakamura | |
| 2014/0253495 A1 | 9/2014 | Kang et al. | |
| 2014/0253829 A1 | 9/2014 | Kim et al. | |
| 2014/0255667 A1 | 9/2014 | Kim et al. | |

* cited by examiner

TOUCH PANEL

CROSS-REFERENCE TO RELATED APPLICATION

This application claims priority from and the benefit of Korean Patent Application No. 10-2015-0052484, filed on Apr. 14, 2015, which is hereby incorporated by reference for all purposes as if fully set forth herein.

BACKGROUND

Field

Exemplary embodiments relate to a touch panel.

Discussion of the Background

A touch panel is an apparatus that recognizes a touch by an object (e.g., a pen or a user's finger). Touch panels are commonly disposed on a display panel (e.g., an organic light emitting diode display and a liquid crystal display device) to input signals to a display device.

The touch panel may include a substrate and a touch sensor unit that is positioned on the substrate to recognize the touch of an object.

Among the touch sensor units, a capacitive type touch sensor unit recognizes a touch by sensing a change in capacitance formed between a first signal line and a second signal line that intersects the first signal line.

To increase the resolution of display panels, more and more first signal lines and second signal lines are included in the touch sensor unit of the touch panel along with the increase in the number of pixels of the display panel. However, mobile devices (e.g., tablets, mobile phones, etc.), thin televisions, and thin computer screens have limited amount of space, thus there is a limit to the number of first signal lines and second signal lines that can be included in these thin and small electronic devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel improving the touch recognition sensitivity in an electronic device with limited space as well as improving the display resolution (e.g., a high resolution display panel) in an electronic device with limited space.

Additional aspects will be set forth in the detailed description which follows, and, in part, will be apparent from the disclosure, or may be learned by practice of the inventive concept.

An exemplary embodiment discloses a touch panel including a substrate, a first signal line positioned on the substrate and extending in a first direction while being bent in a second direction several times, and a second signal line positioned on the substrate and extending in the second direction while being bent in the first direction intersecting the first direction several times to intersect the first signal line.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
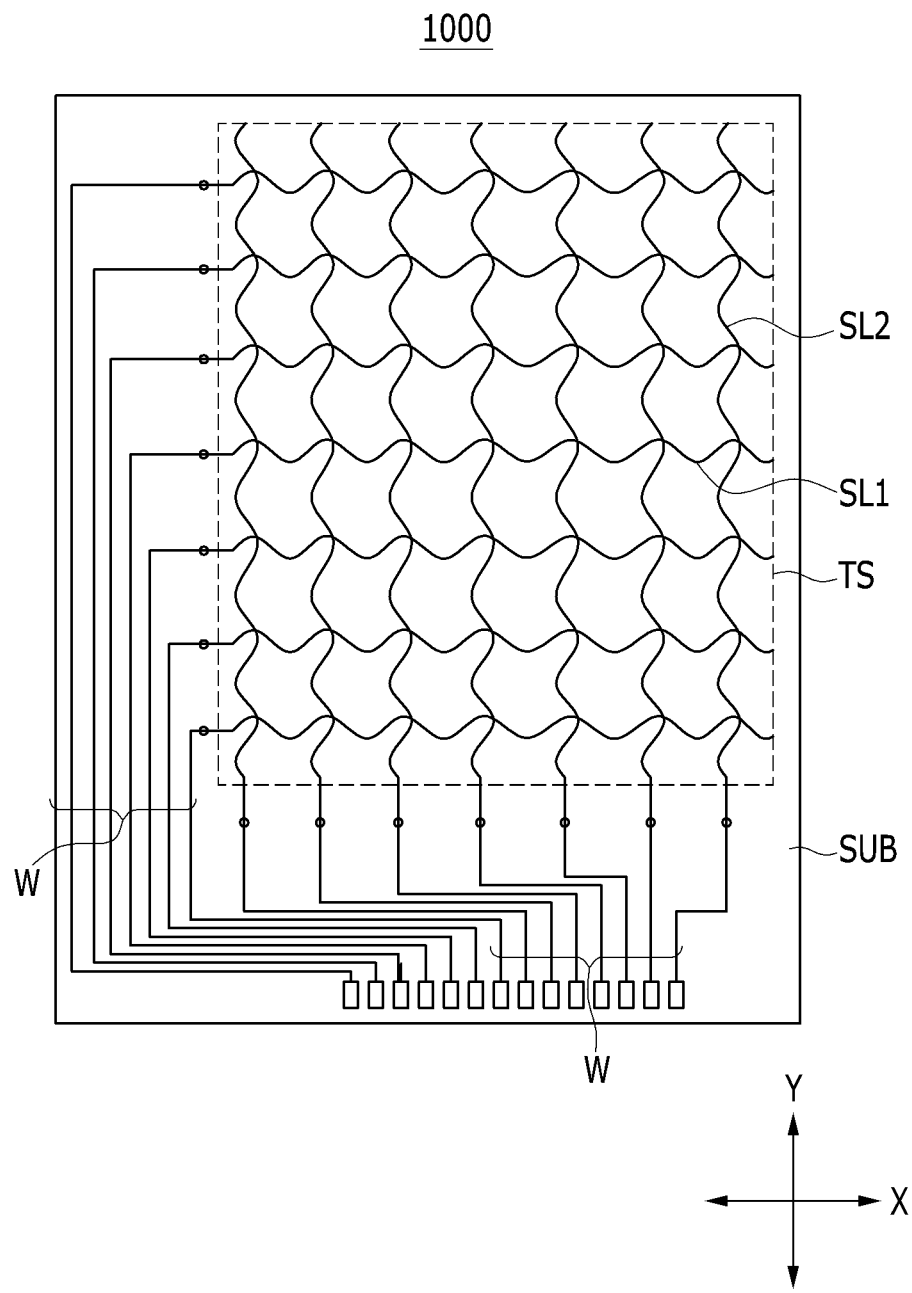
FIG. 1 is a plan view illustrating a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, a touch panel according to an exemplary embodiment will be described with reference to FIGS. 1 and 2.

FIG. 1 is a plan view illustrating a touch panel according to an exemplary embodiment.

As illustrated in FIG. 1, a touch panel 1000 according to an exemplary embodiment recognizes a touch and includes a substrate SUB, a wiring part W, and a touch sensor unit TS. The touch panel 1000 may include a touch controller (not illustrated). The touch controller may be formed as a flexible printed circuit board (FPCB), a printed circuit board (PCB), or the like, and may be connected to the wiring part W. The touch controller may digitize an electrical analog signal transmitted from the touch panel 1000 into a digital signal using a converter, and the like to enable a user to calculate touched location information.

The substrate SUB may be flexible and may include an organic material, an inorganic material, glass, or metals (e.g., stainless steel). The substrate SUB may be flexible but is not limited such properties. For example, the substrate may be stretchable, foldable, bendable, or rollable. The substrate SUB may be flexible, stretchable, foldable, bendable, or rollable, such that the entire touch panel 1000 may be flexible, stretchable, foldable, bendable, or rollable. In an alternative exemplary embodiment, the substrate SUB may be rigid such that the entire touch panel 100 may be rigid.

The wiring part W may be positioned in an outside region of the substrate SUB and is connected to the touch sensor unit TS. The wiring part W may connect between the touch sensor unit TS and the touch controller. The wiring part W may include opaque conductive materials such as metal or transparent conductive materials. The wiring part W may be formed on the substrate SUB using a process different from or the same as the process forming the touch sensor unit TS.

The touch sensor unit TS is a portion of the touch panel 1000 that may directly recognize a touch and may be formed to be transparent. The touch sensor unit TS may be positioned on the substrate SUB and may be configured as a capacitive type sensor.

The touch sensor unit TS may include a first signal line SL1 that extends in a first direction X on the substrate SUB and connects to the wiring part W. The touch sensor unit TS may also include a second signal line SL2 that extends in a second direction Y intersecting the first direction X. The second signal line SL2 may also connect to the wiring part W.

The touch panel 1000 may include multiple first signal lines SL1. Each first signal line SL1 may sequentially be disposed in the second direction Y. Each first signal line SL1 may extend in the first direction X, but may be bent in second direction Y several times. In other words, each first signal line SL1 may in the first direction X having a wave form with the waves in the second direction Y.

The touch panel 1000 may also include multiple second signal lines SL2. Each second signal line SL2 may sequentially be disposed in the first direction X. The second signal line SL2 may extend in the second direction Y, but may be bent in the first direction X several times. In other words, the second signal line SL2 may extend in the second direction Y while having a wave form with waves in the first direction X.

The first signal line SL1 and the second signal line SL2 may be insulated from and intersect each other. An insulating layer or an insulating pattern may be interposed in the portion where the first signal line SL1 and the second signal line SL2 intersect. The insulating layer or the insulating pattern may include at least one of silicon oxide ($SiO_X$) and silicon nitride ($SiN_X$).

The first signal line SL1 and the second signal line SL2 may be positioned on the same layer or different layers on the substrate SUB.

The insulating layer or the insulating pattern may be positioned between the first signal line SL1 and the second signal line SL2.

In the touch panel 1000 configured as described above, when a voltage is sequentially applied to the first signal lines SL1 and the second signal lines SL2, capacitance is formed between the first signal lines SL1 and the second signal lines SL2, respectively. When an object (e.g., a touch pen or a user's finger) touches the touch sensor unit TS, a capacitance of a touched position is changed. Thus, the voltage applied to the first signal line SL1 or the second signal line SL2 is changed such that the touch sensor unit TS of the touch panel 1000 may sense the position where the touch is performed.

In the touch panel 1000 according to an exemplary embodiment, each of the first signal lines SL1 and the second signal lines SL2 extends while being bent several times in a direction intersecting each other. Thus, a space between the first signal line SL1 and the second signal line SL2 corresponding to the portion at which the first signal line SL1 and the second signal line SL2 intersect each other is formed in a curved space in two dimension. The curved space in two dimensions has a larger capacitance area than a comparable area formed form straight intersecting signal lines (i.e., non-bending signal lines). Thus, the space in which capacitance is formed two-dimensionally increases when using bent signal lines and may provide more sensitive capacitance in devices with limited space. Put another way, more capacitance is formed in the curved space formed between the first signal line SL1 and the second signal line SL2 in limited space compared to the same limited space of a touch panel having straight signal lines. Thus, the touch panel 1000 with first signal lines SL1 and second signal lines SL2 results in improved touch recognition sensitivity in a device with limited space.

Hereinafter, the touch sensor unit TS of the touch panel 1000 according to an exemplary embodiment will be described in more detail with reference to FIG. 2.

Figure 2:
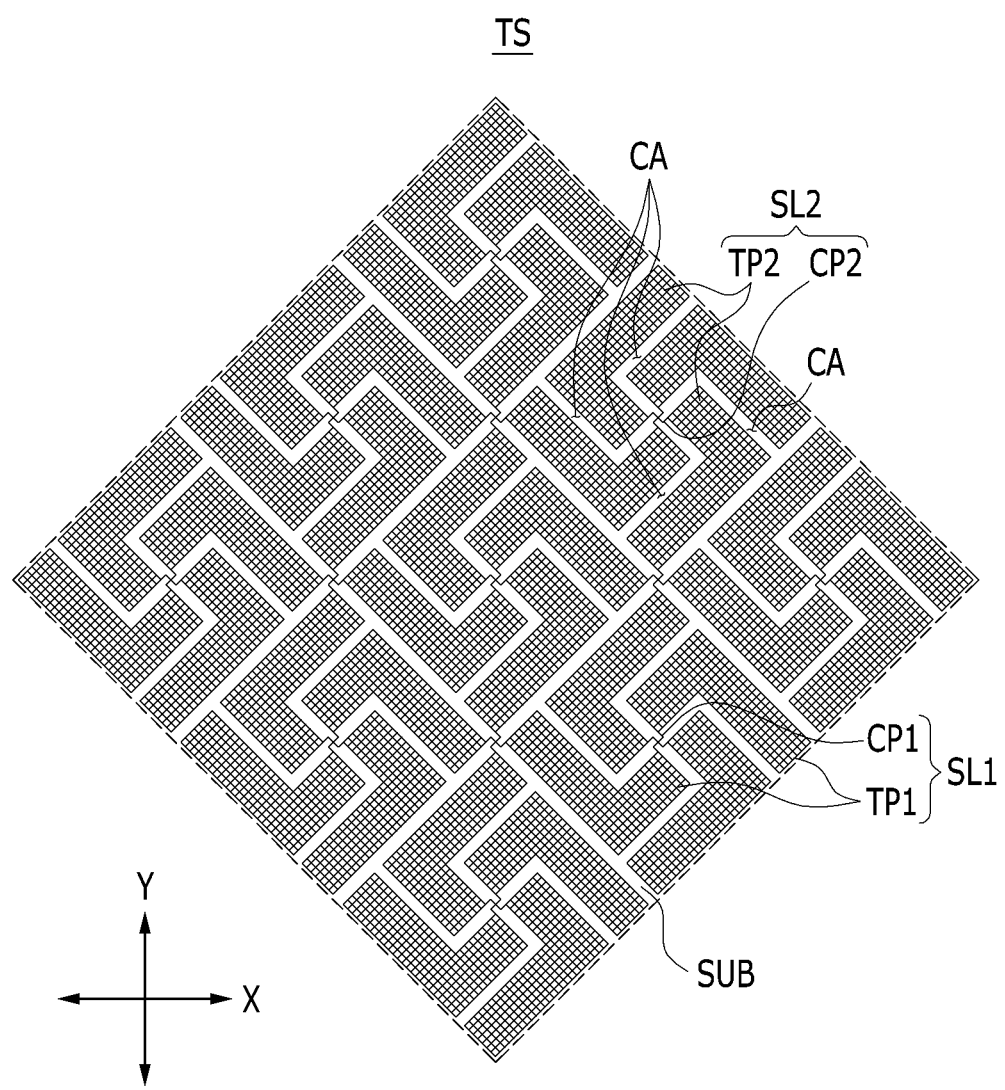
FIG. 2 is a plan view illustrating a portion of a touch sensor unit of the touch panel illustrated in FIG. 1.

FIG. 2 is a plan view illustrating a portion of a touch sensor unit of the touch panel illustrated in FIG. 1.

As illustrated in FIG. 2, the touch sensor unit TS of the touch panel according to an exemplary embodiment includes the first signal line SL1 and the second signal line SL2.

The first signal line SL1 may include a first touch pad part TP1 and a first connection part CP1.

The touch sensor unit TS may include multiple first touch pad parts TP1, and each first touch pad part TP1 may be disposed to be spaced from each other in the first direction X. The first touch pad parts TP1 may each extend while being bent. The first touch pad part TP1 may extend while being bent once. However, exemplary embodiments are not limited to a first touch pad part TP1 being bent only once. Exemplary embodiments are envisioned that include the first touch pad part TP1 may be bent several times. The first touch pad part TP1 has an 'L'-letter shape in two dimensions. However, the touch pad part TP1 is not limited to the 'L'-letter shape. Instead, the first touch pad part TP1 may have a 'C' or 'S'-letter shape in two dimension. The 'C'- and 'S'-letter shape may have curves included in the letter shapes or may only have sharp 90-degree corners such that the 'C'-letter shape is better represented by 'ㄷ' and the 'S'-letter shape is better represented by "ㄹ". Each of the adjacent first touch pad parts TP1, among first touch pad parts TP1, may have an inverted shape to each other. However, the shape or arrangement of shapes for the first touch pad parts TP1 is not so limited. Thus, the first touch pad parts TP1 may have any shape as long as they are bent. The first touch pad part TP1 may include a metal mesh. The first touch pad part TP1 may include the metal mesh made of metal to suppress a delay of a signal passing through the first touch pad part TP1.

The first touch pad part TP1 according to an exemplary embodiment, includes the metal mesh but is not so limited. Thus, the first touch pad part TP1 may include transparent conductive materials such as silver nanowire (AgNW), indium tin oxide (ITO), and indium zinc oxide (IZO).

The first connection part CP1 may connects the different first touch pad parts TP1 together. In particular, the first connection part CP1 may connect adjacent first touch pad parts TP1. The first touch pad part TP1 and the first connection part CP1 may be integrally formed but are not so limited. Thus, the first touch pad part TP1 and the first connection part CP1 may be made of different materials and may be separately formed. The first connection part CP1 may intersect the second connection part CP2 and may be insulated from the second connection part CP2.

As described above, the first touch pad parts TP1 may each extend while being bent. Also each of the adjacent first touch pad parts TP1 may be connected to each other by the first connection part CP1. Each of the adjacent first touch pad parts TP1 may also be spaced apart from each other in the second direction Y while being connected in the first direction X. Thus, the first signal line SL1 extends in the first direction X while being bent several times in the second direction Y.

The second signal line SL2 may include a second touch pad part TP2 and a second connection part CP2.

The second signal line SL2 may include multiple second touch pad parts TP2. Each second touch pad part TP2 may be disposed to be spaced from each other in the second direction Y. The second touch pad parts TP2 may each extend while being bent. The second touch pad part TP2 extends while being bent once but is not so limited (i.e., the second touch pad part TP2 may extend while being bent several times). The second touch pad part TP2 has a 'L'-letter shape in two dimension but is not so limited (e.g., the second touch pad part TP2 may have a 'C', 'S'-letter shape in two dimensions). Each of the adjacent second touch pad parts TP2, among the second touch pad parts TP2 may have an inverted shape to each other but is not so limited (i.e., the second touch pad parts TP2 may have any shape as long as they are bent). The second touch pad part TP2 may include a metal mesh. The second touch pad part TP2 may include the metal mesh made of metal to suppress a delay of a signal passing through the second touch pad part TP2.

The second touch pad part TP2 according to an exemplary embodiment includes the metal mesh but is not so limited. Instead, the second touch pad part TP2 may include transparent conductive materials such as silver nanowire (AgNW), indium tin oxide (ITO), and indium zinc oxide (IZO).

The second connection part CP2 may connect second touch pad parts TP2. More specifically, the second connection part CP2 may connect adjacent second touch pad parts TP2. The second touch pad part TP2 and the second connection part CP2 may integrally be formed. However, exemplary embodiments are not so limited. Instead, the second touch pad part TP2 and the second connection part CP2 may be made of different materials and formed separately. The second connection part CP2 may be insulated from and intersects with the first connection part CP1.

As described above, the second touch pad parts TP2 may each extend while being bent. Each of the adjacent second touch pad parts TP2 may be connected to each other by the second connection part CP2. Additionally, each of the adjacent second touch pad parts TP2 may be spaced from each other in the first direction X. Thus, the second signal line SL2 extends in the second direction Y while being bent several times in the first direction X.

The first touch pad part TP1 may be adjacent to the second touch pad part TP2. The first touch pad part TP1 may enclose a portion of the second touch pad part TP2 and the second touch pad part TP2 may enclose a portion of the first touch pad part TP1 according to the position. In other words, any one of the first touch pad part TP1 and the second touch pad part TP2 may enclose a portion of the other one touch pad part TP1, TP2.

The first touch pad part TP1 and the second touch pad part TP2 may be each positioned on the same layer on the substrate SUB and may include the same material. However, exemplary embodiments are not so limited (i.e., the first touch pad part TP1 and the second touch pad part TP2 may be each disposed on different layers on the substrate SUB and include different materials). For example, the first touch pad part TP1 and the second touch pad part TP2 each may be simultaneously formed on the substrate SUB by a one-time process or may be formed on the substrate SUB in different steps by different processes.

In the touch panel configured as described above, when a voltage is sequentially applied to the first signal lines SL1 and the second signal lines SL2, a capacitance is formed in a capacitance area CA between the first touch pad parts TP1 and the second touch pad parts TP2, respectively. In this case, when an object touches the touch sensor unit TS, a capacitance of the touched capacitance area CA is changed and thus the voltage applied to the first touch pad part TP1 or the second touch pad part TP2 is changed, such that the touch sensor unit TS of the touch panel 1000 may sense the position of the touch sensor unit TS that was touched.

As described above, in the touch panel according to an exemplary embodiment, each of the first touch pad parts TP1 and the second touch pad parts TP2 adjacent to each other may extend while being bent in a direction intersecting each other. Thus, the capacitance area CA between the first touch pad part TP1 and the second touch pad part TP2 is formed in the curved line space in two dimensions. As such, the capacitance area CA of the touch senor unit TS increases in a set space device (i.e., a limited space device) when compared with the capacitance area CA of a touch sensor unit having touch pad parts that are straight (i.e., straight signal lines).

In other words, more capacitance is formed in the capacitance area CA having the curved shape formed between the first touch pad part TP1 and the second touch pad part TP2 in a limited space to provide the touch panel 1000 including the touch sensor unit TS with the improved touch recognition sensitivity in the limited space.

A display panel displaying a high resolution image typically has a large number of pixels requiring the display panel and the electronic device with the display panel to increase in size to accommodate additional pixels to display high resolution images with touch capabilities. Here, the touch sensor unit TS of the touch panel according to an exemplary embodiment has improved touch recognition sensitivity in a limited space (i.e., improved touch recognition sensitivity without increasing the size of an electronic device) with a high-resolution display panel. Put another way, the touch panel including the touch sensor unit TS of an exemplary embodiment is optimized for the high-resolution display panels without substantially increasing the size of the display.

In the touch panel according to an exemplary embodiment, the first touch pad part TP1 and the second touch pad part TP2 of the touch sensor unit TS each include the metal mesh. Thus, the first touch pad part TP1 and the second touch pad part TP2 may each have a low electrical resistance against a transparent conductive oxide, such as indium tin oxide (ITO), such that the delay of the signal flowing in each of the first signal line SL1 and the second signal line SL2 is suppressed. In other words, the delay of the signal flowing in the first signal line SL1 and the second signal line SL2 may be suppressed. Thus, the touch panel of an exemplary embodiment may include a touch sensor unit TS having improved touch recognition sensitivity.

In the touch panel according to an exemplary embodiment, each of the first touch pad part TP1 of the touch sensor unit TS and the second touch pad part TP2 includes the metal mesh and the substrate SUB is also formed flexibly, thereby generally improving flexibility. In other words, the flexible touch panel of an exemplary embodiment may be optimized for the flexible display panel.

In the touch panel 1000 according to an exemplary embodiment, each of the first touch pad part TP1 and the second touch pad part TP2 includes the metal mesh. Thus, even though stress may be applied to the touch panel depending on whether the touch panel is bent, each of the first touch pad part TP1 and the second touch pad part TP2 may include the metal mesh that easily bends when stressed. The metal mesh in the first touch pad part TP1 and the second touch pad part TP2 may disperse applied stress such that each of the first touch pad part TP1 and the second touch pad part TP2 is suppressed from being damaged. In other words, the touch panel of an exemplary embodiment is suppressed from being damaged from applied stress.

Hereinafter, a touch panel according to an exemplary embodiment will be described with reference to FIG. 3. Hereinafter, components different from those of the touch panel according to an exemplary embodiment described above will be described.

Figure 3:
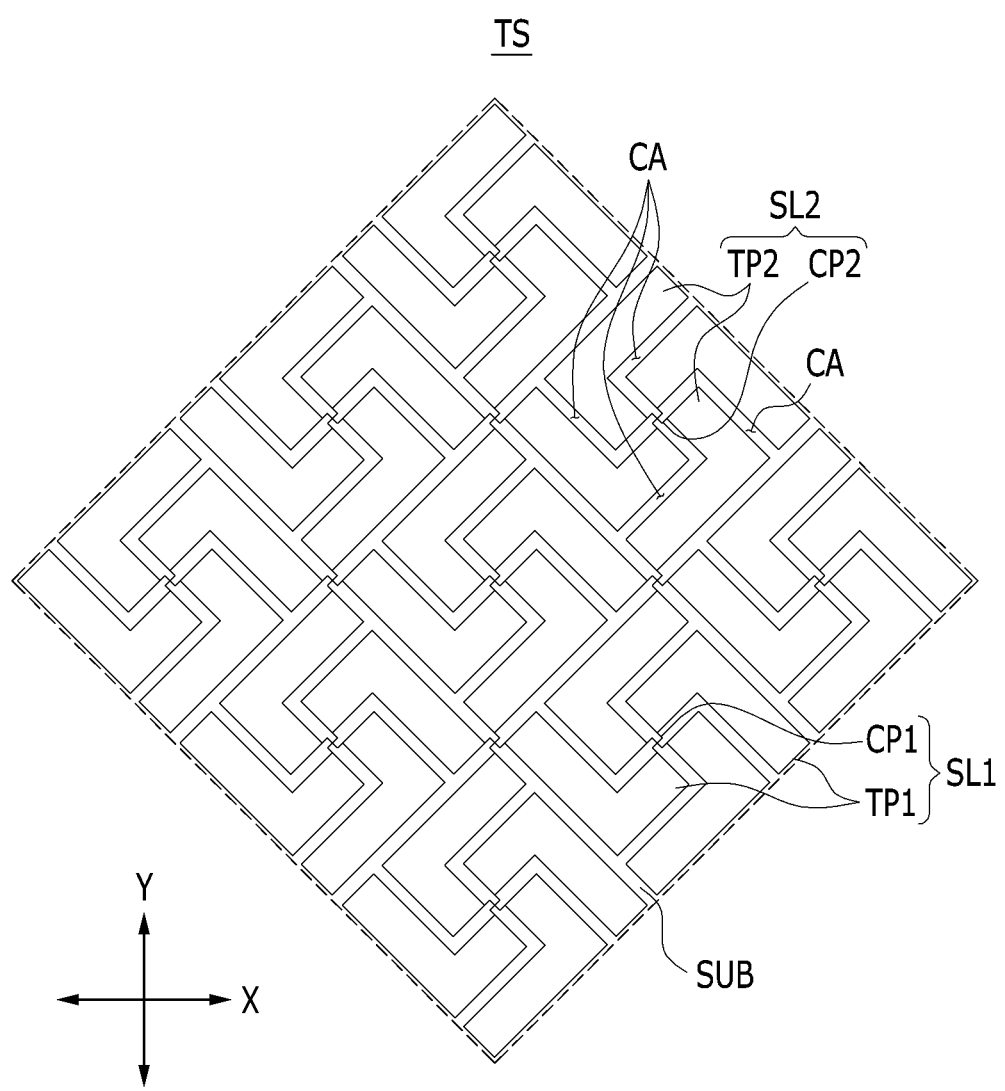
FIG. 3 is a plan view illustrating a portion of a touch sensor unit of a touch panel according to an exemplary embodiment.

FIG. 3 is a plan view illustrating a portion of a touch sensor unit of a touch panel according to an exemplary embodiment.

The first touch pad part TP1 and the second touch pad part TP2 may each include the transparent conductive materials such as silver nanowire (AgNW), indium tin oxide (ITO), and indium zinc oxide (IZO).

The first touch pad part TP1 and the second touch pad part TP2 may each extend while being bent in one plate form in two dimensions.

As described above, in the touch panel according to an exemplary embodiment, each of the first touch pad parts TP1 and each of the second touch pad parts TP2 that are adjacent to each other extend while being bent in a direction intersecting each other. Thus, the capacitance area CA between the first touch pad part TP1 and the second touch pad part TP2 is formed in the curved line space in two dimensions. The capacitance area CA of the touch panel according to an exemplary embodiment is larger than the capacitance area CA of a touch panel having the same size with straight touch pad parts (i.e., straight signal lines). The first touch pad part TP1 and the second touch pad part TP2 may not include the metal mesh.

In other words, more capacitance is formed in the capacitance area CA having the curved shape formed between the first touch pad part TP1 and the second touch pad part TP2 in the limited space to provide the touch panel including the touch sensor unit TS with the improved touch recognition sensitivity in the limited space.

A display panel displaying a high resolution image typically has a large number of pixels requiring the display panel and the electronic device with the display panel to increase in size to accommodate the additional pixels to display the high resolution images with touch capabilities. Here, the touch sensor unit TS of the touch panel according to an exemplary embodiment has improved touch recognition sensitivity in a limited space (i.e., improved touch recognition sensitivity without increasing the size of an electronic device) with the high-resolution display panel. Put another way, the touch panel including the touch sensor unit TS of an exemplary embodiment is optimized for the high-resolution display panels without substantially increasing the size of the display.

Hereinafter, a touch panel according to an exemplary embodiment will be described with reference to FIG. 4. Hereinafter, components different from those of the touch panel according to an exemplary embodiment described above will be described.

Figure 4:
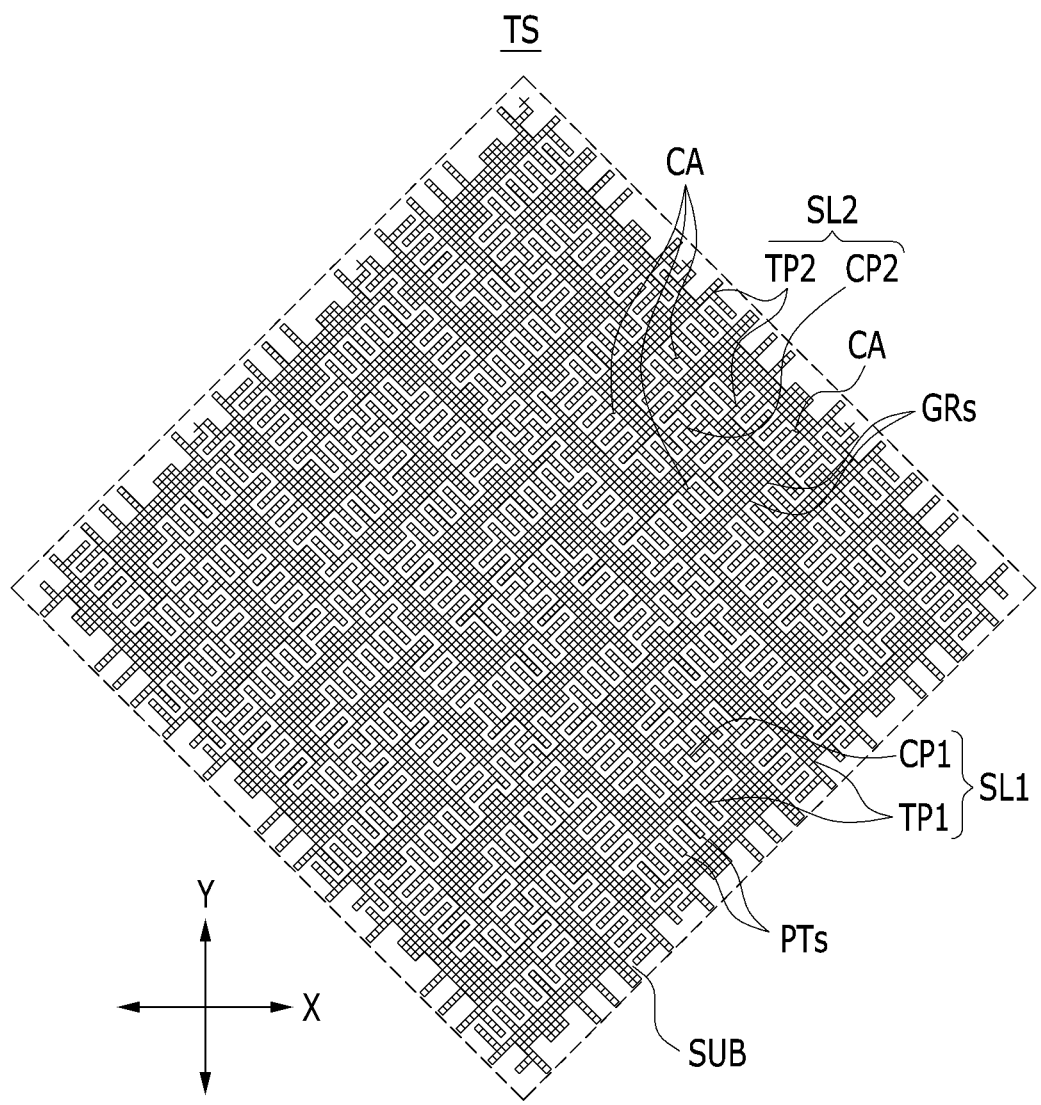
FIG. 4 is a plan view illustrating a portion of a touch sensor unit of a touch panel according to an exemplary embodiment.

FIG. 4 is a plan view illustrating a portion of a touch sensor unit of a touch panel according to an exemplary embodiment.

As illustrated in FIG. 4, the first touch pad part TP1 of the touch panel according to an exemplary embodiment includes protrusions PTs which protrude two-dimensionally in a direction of the second touch pad part TP2. The protrusions PTs are positioned while being spaced apart from each other along the edges of the first touch pad part TP1.

The second touch pad part TP2 may includes depressions GRs in which each of the protrusions PTs of the first touch pad part TP1 is positioned. The depressions GRs have a two-dimensionally depressed shape. The depressions GRs are positioned while being spaced apart from each other along the edges of the second touch pad part TP2.

The protrusions PTs and the depressions GRs each may be included in the second touch pad part TP2 and the first touch pad part TP1, respectively. In other words, any one of the first touch pad part TP1 and the second touch pad part TP2 may include the protrusions PTs which protrude in another direction and the other as well as include (or alternately include) the depressions GRs in which the PTs are each positioned. Further, the protrusions PTs may be positioned while being spaced from each other along an edge of any one of the first touch pad part TP1 and the second touch pad part TP2.

In the touch panel according to an exemplary embodiment configured as described above, any one of the first touch pad part TP1 and the second touch pad part TP2 includes the protrusions PTs while extending and being bent in a direction in which the first touch pad part TP1 and the second touch pad part TP2 adjacent to each other intersect. The opposing touch pad part (i.e., the second touch pad part TP2 if the first touch pad part TP1 includes the protrusions PTs, the first touch pad part TP1 if the second touch pad part TP2 includes the protrusions PTs, or the first and second touch pad parts TP1, TP2 if both the first and second touch pad parts include the protrusions PTs) includes the depressions GRs. Thus, the capacitance area CA between the first touch pad part TP1 and the second touch pad part TP2 forms while extending in the curved direction in a two-dimensionally waved form. The capacitance area CA of the touch panel according to an exemplary embodiment has a larger capacitance area CA than a touch panel of the same size having straight touch pad parts (i.e., straight signal lines). In other words, the touch panel including the touch sensor unit TS of an exemplary embodiment results in an improved touch recognition sensitivity in the limited space when compared to a touch panel having straight signal lines.

A display panel displaying a high resolution image typically has a larger number of pixels requiring the display panel and the electronic device with the display panel to increase in size to accommodate the additional pixels to display the high resolution image in a touch capable display. Here, the touch sensor unit TS of the touch panel according to an exemplary embodiment has the improved touch recognition sensitivity in a limited space (i.e., improved touch recognition sensitivity without increasing the size of the electronic device) with the high-resolution display panel. Put another way, the touch panel including the touch sensor unit TS of an exemplary embodiment may be optimized for the high-resolution display panels without substantially increasing the size of the display.

Further, in the touch panel according to an exemplary embodiment, the first touch pad part TP1 and the second touch pad part TP2 of the touch sensor unit TS each include the metal mesh. Thus, the first touch pad part TP1 and the second touch pad part TP2 may each have a low electrical resistance against a transparent conductive oxide such as indium tin oxide (ITO), such that the delay of the signal flowing in each of the first signal line SL1 and the second signal line SL2 is suppressed. In other words, the delay of the signal flowing in the first signal line SL1 and the second signal line SL2 is suppressed and thus the touch panel including the touch sensor unit TS having the improved touch recognition sensitivity is provided.

Further, in the touch panel according to an exemplary embodiment, each of the first touch pad part TP1 of the touch sensor unit TS and the second touch pad part TP2 includes the metal mesh and the substrate SUB is also formed flexibly, thereby generally improving flexibility. In other words, the flexible touch panel is optimized for the flexible display panel.

Further, in the touch panel 1000 according to an exemplary embodiment, each of the first touch pad part TP1 and the second touch pad part TP2 includes the metal mesh. Thus, even though stress may applied to the touch panel depending on whether the touch panel is bent, each of the first touch pad part TP1 and the second touch pad part TP2 may include the metal mesh that easily bends when stressed. The metal mesh in the first touch pad part TP1 and the second touch pad part TP2 may disperse applied stress such that each of the first touch pad part TP1 and the second touch pad part TP2 is suppressed from being damaged. In other words, the touch panel an exemplary embodiment is suppressed from being damaged from the applied stress.

According to an exemplary embodiment, it is possible to provide a touch panel with improved touch recognition sensitivity in a limited space, as well as improved resolution in a display panel with limited space.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
   a substrate;
   a first signal line positioned on the substrate and extending in a first direction while being bent in a second direction several times; and
   a second signal line positioned on the substrate and extending in the second direction while being bent in the first direction intersecting the first direction several times to intersect the first signal line,
   wherein the first signal line comprises:
       first touch pad parts each spaced apart from each other in the second direction and extending in the first direction while each being bent in the second direction; and
       a first connection part directly connecting adjacent first touch pad parts, and wherein the second signal line comprises:
       second touch pad parts each spaced apart from each other in the first direction and extending in the second direction while each being bent in the first direction; and
       a second connection part directly connecting adjacent second touch pad parts and intersecting the first connection part while being insulated from the first connection part,
   wherein each of the first touch pad parts and the second touch pad parts are L-shaped, and
   wherein each of the first touch pad parts and the second touch pad parts have substantially the same planar area size.

2. The touch panel of claim 1, wherein the first connection part generally extends in the second direction connecting adjacent first touch pad parts extending in the first direction and the second connection part generally extends in the first direction connecting adjacent second touch pad parts extending in the second direction.

3. The touch panel of claim 2, wherein any one of the first touch pad part and the second touch pad part encloses a portion of the other.

4. The touch panel of claim 3, wherein:
   at least one of the first touch pad part and the second touch pad part comprises protrusions that protrude toward at least one of the first touch pad part and the second touch pad part, and at least one of the first touch pad part and the second touch pad part comprises depressions such that the protrusions of the at least one of the first touch pad part and the second touch pad part are positioned within the depressions.

5. The touch panel of claim 4, wherein the protrusions are positioned while being spaced apart from each other along an edge of at least one of the first touch pad part and the second touch pad part.

6. The touch panel of claim 1, wherein each of the first touch pad part and the second touch pad part comprises a metal mesh.

7. The touch panel of claim 6, wherein the substrate is flexible.

8. The touch panel of claim 1, wherein each of the first touch pad part and the second touch pad part comprises a transparent conductive material.

9. The touch panel of claim 8, wherein each of the first touch pad part and the second touch pad part has a plate shape.

10. The touch panel of claim 1, wherein each of the first touch pad part and the second touch pad part is positioned on the same layer on the substrate.

11. The touch panel of claim 1, wherein each of the first touch pad part and the second touch pad part is positioned on different layers on the substrate.

* * * * *